United States Patent [19]

Campagnolo

[11] 4,244,239
[45] Jan. 13, 1981

[54] PEDAL FOR BICYCLES

[76] Inventor: Tullio Campagnolo, Corso Padova, 168, 36100 Vicenza, Italy

[21] Appl. No.: 14,030

[22] Filed: Feb. 22, 1979

[51] Int. Cl.³ .......................... G05G 1/14; G05G 1/18
[52] U.S. Cl. ........................................ 74/560; 74/564; 74/594.4; 74/594.6
[58] Field of Search ...................... 74/564, 560, 594.6, 74/594.4

[56] References Cited

U.S. PATENT DOCUMENTS

| 535,065 | 3/1895 | Lester | 74/594.6 |
| 546,412 | 9/1895 | Bevin | 74/594.6 |
| 608,620 | 8/1898 | Nelson | 74/594.6 |
| 636,968 | 11/1899 | Esperson | 74/594.6 |
| 827,356 | 7/1906 | Fox | 74/594.6 |
| 2,831,370 | 4/1958 | Smith | 74/594.6 |

FOREIGN PATENT DOCUMENTS

| 583531 | 1/1925 | France | 74/594.6 |
| 2337075 | 12/1975 | France | 74/594.4 |
| 14326 | of 1893 | United Kingdom | 74/594.6 |
| 22499 | of 1896 | United Kingdom | 74/594.6 |
| 20457 | of 1896 | United Kingdom | 74/594.6 |
| 17870 | of 1897 | United Kingdom | 74/594.6 |
| 186440 | 10/1922 | United Kingdom | 74/594.6 |

Primary Examiner—Leslie Braun
Attorney, Agent, or Firm—Young & Thompson

[57] ABSTRACT

In a pedal for bicycles there is provided a slanting guide extending from the top of the longitudinal element close to the toe clip of the peripheral band of the pedal, towards the central pin of the pedal itself.

4 Claims, 5 Drawing Figures

PEDAL FOR BICYCLES

BACKGROUND OF THE INVENTION

The present invention relates to improvements in bicycle pedals.

It is known that, in sports or competition bicycles, the pedals are equipped with a toe clip into which the foot of the cyclist is introduced to take up, in respect of the pedal, the most correct position for pedalling. In the known type pedals, it may happen quite frequently that the tip of the cylist's shoe may knock—when introducing itself into the toe clip—against that part of the peripheral band of the pedal being close to the toe clip. This may delay and make more difficult and troublesome the introduction of the cyclist's foot into the toe clip, and may thus form an even serious drawback in particular circumstances, as for example during races and contests.

SUMMARY OF THE INVENTION

To prevent the aforementioned drawback, the present invention provides a pedal for bicycles in which a slanting guide is associated to the longitudinal element of the peripheral band of the pedal being close to the toe clip, said guide extending towards the central pin of the pedal and thereby preventing any possible stumbling of the cyclist's shoe against the band, while ensuring its easy and prompt introduction into the toe clip. This guide may be of any shape and may be applied in any manner, as long as it substantially forms an inclined surface, terminating at the top of the aforespecified element of the pedal band, and onto which the cyclist's shoe may be guided towards the toe clip.

BRIEF DESCRIPTION OF THE DRAWINGS

The invention will now be illustrated with reference to the accompanying drawings, which show some preferred embodiments thereof and in which.

DESCRIPTION OF THE PREFERRED EMBODIMENTS

Figure 1:
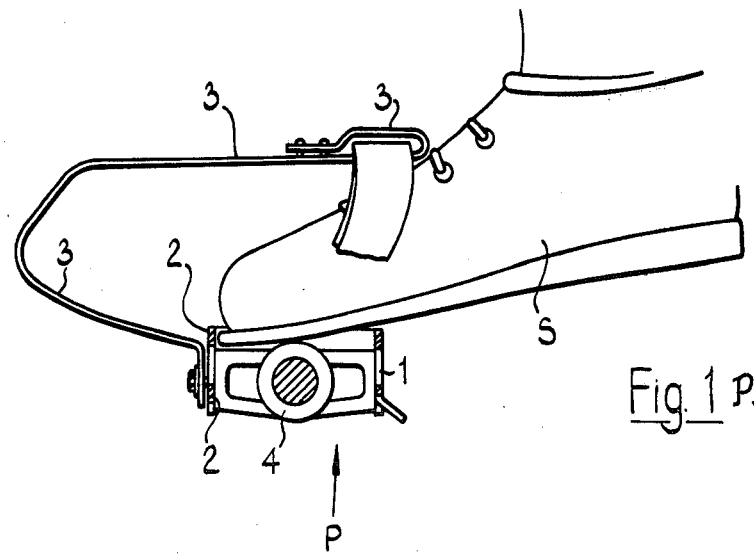
FIG. 1 is a side view of a pedal according to known technique, showing how the cyclist's shoe may stumble in its movement of introduction into the toe clip.

In FIG. 1, the pedal P according to known technique comprises a peripheral band 1, to the longitudinal element 2 of which there is fixed the toe clip 3. When the cyclist's shoe S is introduced into the toe clip, it may easily happen that its point Sp knocks against the upper part of the longitudinal element 2 of the peripheral band 1 of the pedal, due to the fact that the cyclist tends to rest it on the central pin 4 of the pedal, using the same as a guide. The introduction of the foot into the toe clip may thus meet with a stumbling-block, by no means negligible, and this stumbling action can be dangerous for the inexpert person, throwing him off his balance, and it can be harmful for the expert cyclist in that, during races or contests, it may delay his starting off and his quickness of action.

This drawback is entirely eliminated by the present invention: in the pedal P shown in FIGS. 2 to 5, a slanting guide 5 is associated to the longitudinal element 2 of the peripheral band 1 of the pedal being close to the toe clip 3, said guide extending close to the central pin 4 of the pedal.

Figure 2:
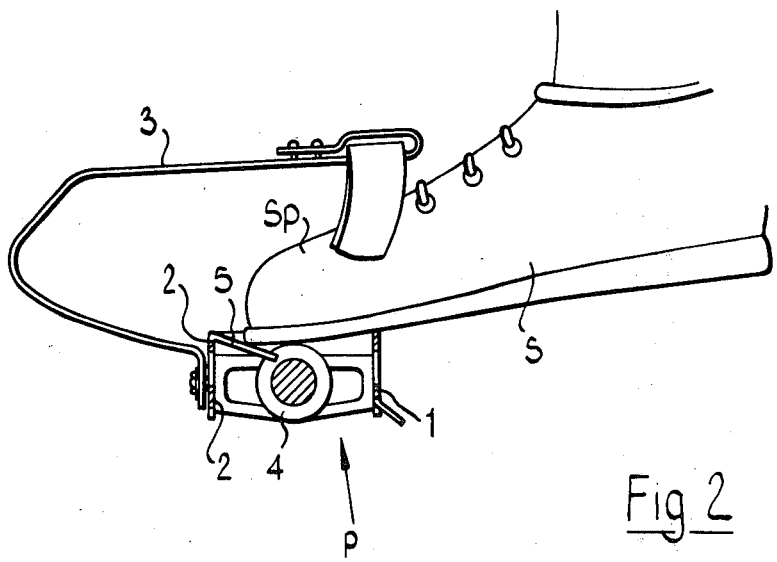
FIG. 2 is a view similar to that of FIG. 1, showing how the pedal according to the invention helps to prevent the drawback deriving from previous technique.
Figure 3:
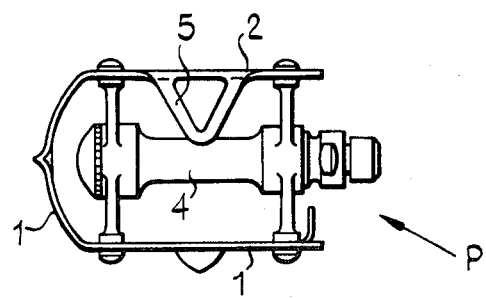
FIG. 3 is a plan view of an embodiment of the pedal according to the invention.
Figure 4:
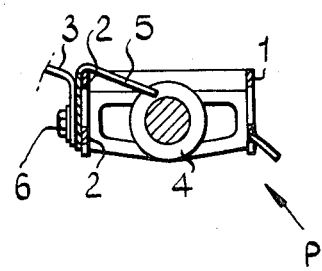
FIGS. 4 and 5 are partial views, similar to that of FIG. 2, showing two slightly modified embodiments of the pedal according to the invention.
Figure 5:
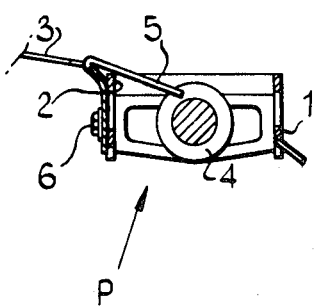

Said guide can be realized in various ways: in the case of FIGS. 2 and 3, it is obtained in one piece with the element 2 of the pedal band, by blanking and bending of metal sheet; in FIG. 4, it is formed as a simple independent plate, which may be of metal or of plastic and which is mounted together with the toe clip 3, by being fixed with screw means 6 to the element 2 of the pedal band 1; in FIG. 5 it is formed by a tongue obtained on the toe clip 3 and appropriately bent. In each case, the guide 5 forms an inclined surface, extending from the top of the longitudinal element 2 of the peripheral band 1 of the pedal and terminating close to the central pin 4 of the pedal itself. Moreover, in each case, the guide has preferably a triangular slotted shape, as clearly shown in FIG. 3, though other embodiments thereof are evidently possible.

As can easily be seen on examining FIG. 2 of the drawings, when the cyclist introduces his foot into the toe clip 3 of the pedal P, the shoe S is guided towards the toe clip itself without meeting obstacles of any kind, its point Sp sliding on the guide 5 and not being in a position to knock against the longitudinal element 2 of the peripheral band 1 of the pedal carrying the toe clip: the introduction of the foot thus takes place very quickly and easily, with all the advantages deriving therefrom both for the common user and for the cyclist during a contest.

I claim:

1. In a pedal for bicycles, comprising a central pivot pin, a peripheral band that pivots on the pin, the band having front and rear portions disposed forwardly and rearwardly of the pin, a toe clip that extends forwardly of said front portion and then upwardly and then rearwardly, and means mounting the toe clip to the front portion of the pedal; the improvement comprising a guide for the toe of a shoe of a bicyclist, the guide being carried by the pedal and extending from said front portion in a smooth and continuous incline downwardly rearwardly toward said pin, the guide having an upper surface in the vicinity of said front portion that is at least as high as the top of said front portion, thereby to prevent the top of said front portion from interfering with the toe of the shoe of bicyclist when the toe is inserted in said toe clip, said guide being formed in a one-piece unitary manner with said front portion of the pedal band.

2. A pedal as claimed in claim 1, wherein said upper surface of the guide in the vicinity of said front portion is higher than the top of said front portion.

3. Pedal as in claim 1, wherein said guide is of triangular shape and is slotted.

4. Pedal as in claim 1, wherein said guide extends from said forward portion of the band up to a point close to said pin and slightly above the same.

* * * * *